United States Patent Office 3,367,303
Patented Feb. 6, 1968

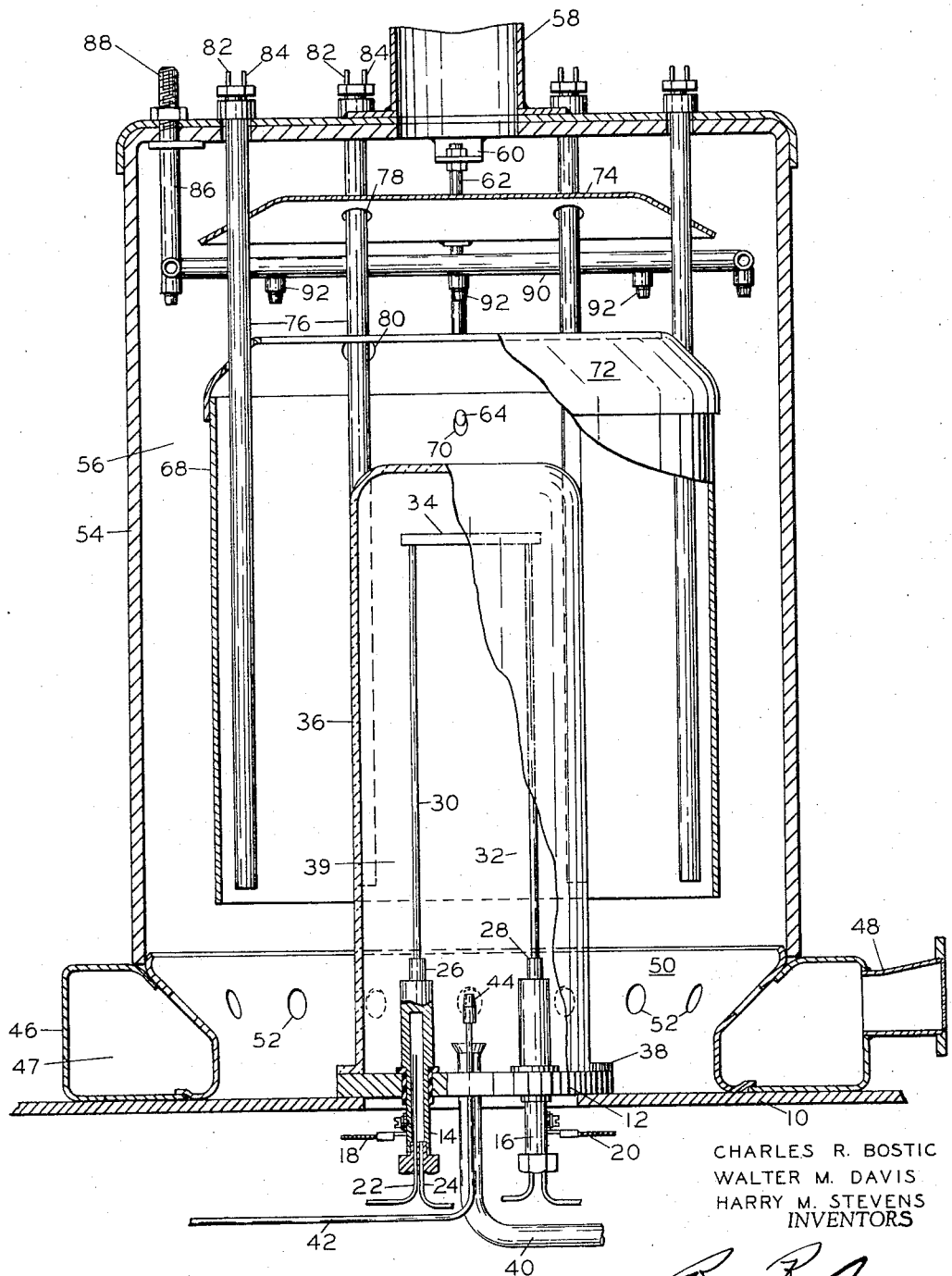

3,367,303
CHEMICAL EQUIPMENT
Charles R. Bostic, Overland, Walter M. Davis, St. Louis, and Harry M. Stevens, Crystal Lake, Mo., assignors to Monsanto Company, a corporation of Delaware
Filed May 29, 1963, Ser. No. 284,087
8 Claims. (Cl. 118—49.5)

This invention relates to apparatus for deposition of materials and more particularly the invention relates to apparatus for deposition of a material as illustrated by a semiconductor material upon a hot body within an enclosed vessel.

In preparing materials in ultra pure form it is conventional practice to introduce a compound of the desired material, elements which will react to form the desired material, or vapors of the desired material into an enclosed chamber where the material is formed or deposited upon a hot body. For example in the manufacture of semiconductor grade elemental silicon a compound of silicon such as trichlorosilane in combination with a reducing gas is introduced into an enclosed vessel containing a heated rod of elemental silicon. Contact of the silicon compound with the hot silicon rod in the presence of the reducing gas results in decomposition of the compound and the deposition of elemental silicon upon the hot rod of silicon. Similarly in the preparation of a III–V material such as gallium arsenide vapors of gallium and arsenic can be condensed upon a surface under such conditions that they react in the proper proportions to form the desired compound simultaneously with deposition upon said surface.

In procedures such as the above, difficulty is generally encountered with the undesired deposition of materials upon the walls of the vessel in which the material is formed. This, of course, could be alleviated by retaining the vessel walls at a very high temperature but this is undesirable for numerous reasons. It has been found in most instances, however, that if the vessel walls are uniformly maintained within a very limited moderate temperature range that undesirable deposition upon the walls of the vessel can be minimized. For example, in the manufacture of silicon it has been found that if the vessel walls of any segment thereof are allowed to remain at a temperature below about 400° C. an amorphous deposit of silicon rapidly builds upon the walls or that segment thereof which is below such temperature and if the vessel wall is above about 800° C. crystalline silicon is deposited thereon. If, however, the walls of the vessel in which the reaction is being conducted are maintained uniformly at about 700° C. they remain remarkably free of silicon. The deposition of silicon upon the vessel walls is disadvantageous in that it requires a manual cleaning of the vessel which is usually formed of quartz and is subject to breakage during cleaning. In addition, deposition upon the vessel wall reduces yield and in the event that the temperature of the vessel wall is non-uniform, results in a corresponding non-uniformity in the rate at which silicon is deposited upon the hot substrate where deposition is desired.

Retaining a vessel wall at a uniform temperature is not so simple as it might first appear since if one attempts to contact the wall with a cooling fluid the point at which contact is first effected is cooler than the remaining portions of the vessel walls. Further, the amount of heat received by the vessel wall from the hot body and the reaction which is being conducted within the vessel varies so that provision must be made for corresponding variations in the rate at which heat is externally transferred to or from the vessel wall.

It is an object of this invention to provide an apparatus for deposition of a material on a hot body within an enclosed vessel including means to retain the vessel wall at a relatively uniform and constant temperature.

It is another object of the invention to provide apparatus for the deposition of a material on a hot body which is useful in the manufacture of silicon and which minimizes the deposition of silicon upon the wal lof the vessel.

The above as well as other objects of the invention are accomplished by an apparatus for deposition of a material on a hot body within an enclosed vessel comprising enclosure means at least partially surrounding said vessel, means for circulating a heat transfer fluid with said enclosed means at a relatively rapid rate, and means for introducing the fluid into and withdrawing the fluid from within the enclosure at a controlled rate. The apparatus also preferably includes heating means so that the temperature differential of the heat transfer fluid entering and being withdraw from the enclosure, the rate at which the fluid is withdrawn, the heat ouput from the heater means and the rate at which heat is transferred to the walls of the vessel from the hot body upon which deposition is being effected can be correlated to maintain the walls of the vessel uniformly within a narrow temperature range.

In addition to the advantage of reducing the frequency with which the vessel enclosing a hot body upon which deposition is being effected must be cleaned and the advantage of permitting more uniform deposition upon the hot body, apparatus according to this invention has numerous other advantages. One such advantage is that of increased efficiency since deposition can be effected primarily upon the hot body where it is desired rather than upon the vessel wall where it is not desired. A further advantage is that the invention reduces power requirements because of decreased heat losses. Still another advantage of the invention is that it usually makes possible increased rates of deposition because heretofore one limiting factor determining the maximum permissible rate of deposition has been a tendency for increased deposition upon the walls of the vessel at higher rates of deposition upon the hot body. Other advantages of the invention will be apparent from a detailed description of the invention which follows.

One preferred specific embodiment of the invention will now be described with reference to the accompanying drawing which is a sectional view with parts broken away of a deposition chamber for the formation of semiconductor rods of silicon or the like.

With reference to the drawing in greater detail there is illustrated a support member 10 having an opening over which is mounted a base plate 12, and extending through plate 12 are two electrodes 14 and 16, which are connected across a suitable source of EMF, not illustrated, through leads 18 and 20. The electrodes 14 and 16 are, in each instance, hollow and are provided with means such as tubes 22 and 24 for circulating a suitable cooling fluid, such as hydrogen, interiorly thereof so that they can be maintained at an even temperature.

Secured in suitable recesses in the upper exteremities of electrodes 14 and 16 are a pair of holders 26 and 28, which are preferably formed of graphite or the like and are attached to rods of semiconductor material 30 and 32. The semiconductor rods 30 and 32 are in turn connected at their upper ends by a bridge 34. The bridge can be formed of any suitably electrically conductive material, such as carbon, and completes an electrical circuit so that when an EMF is operatively applied across the leads 18 and 20, an electrical current flows through the rods 30 and 32, and they are heated to an elevated temperature by resistance heating, thereby providing a pair of hot bodies upon which a selected semiconductor material or the like can be deposited as will subsequently be described in detail.

Mounted upon base plate 12 is an inverted cylindrical vessel 36 having a flange 38 which forms a gas tight seal with the base plate 12, thereby providing an enclosed chamber generally indicated by the reference numeral 39. The cylindrical vessel 36 is closed at its upper end and is preferably formed of a transparent, chemically inert material such as quartz.

Also extending through base plate 12 is an exhaust tube 40 and a supply tube 42 which enters chamber 39 coaxially with exhaust tube 40 and which has a nozzle 44 at its upper extremity. This arrangement permits the supplying to chamber 39 of a gas through tube 42 and nozzle 44 such that it is directed upwardly into contact with the rods 30 and 32 to thereby result in the deposition of a desired material, such as silicon, upon the heated rods. Unreacted gases supplied through tube 42 and nozzle 44 as well as by-product gases can then be withdrawn through exhaust tube 40.

Resting upon support member 10 is an annular member 46 which is hollow so that it provides an annular chamber, generally indicated by the reference numeral 47, and to which is attached a short, flanged conduit 48. Conduit 48 is operatively connected to chamber 47 and provides the chamber with an outlet means to which suitable piping can be connected. The annular member 46 is so shaped that a portion of its exterior provides an inverted frustro-conical surface 50 which serves as a baffle in a manner to be subsequently described, and which is provided with a plurality of openings 52 leading into chamber 47 within the annular member 46.

The reference numeral 54 designates a tubular enclosure member or jacket closed at its upper end and open at the bottom and which can be formed of any suitable material but is preferably of an insulating material such as two layers of metal separated by a layer of fiber glass or the like. The jacket 54 is designed to rest upon the annular member 46 and, if desired, can be secured thereto for example by welding, grazing or any other suitable means, or alternatively it may be unsecured so that the enclosure member can be raised without lifting the annular member 46. In either case the jacket 54 in combination with annular member 46 and support member 10 provides an enclosed chamber, generally indicated by the reference numeral 56, within which the vessel 36 is operatively disposed. If desired, the jacket 54 can be provided with one or more windows, not illustrated, to permit viewing of operations conducted inside the vessel 36. Means, such as a conduit 58 secured to the upper exterior face of jacket 54, is provided for supplying a heat-transfer fluid to the chamber 56 which in operation is eventually withdrawn at a controlled rate through the openings 52 as will subsequently be described in detail. Conventional means such as a metering pump or valve and flow meter, not illustrated, can be employed in combination with conduit 58 or conduit 48 for controlling the rate at which a heat transfer fluid is fed into and withdrawn from chamber 56.

Extending from the upper inner surface of jacket 54 are a plurality of support tab members one of which is indicated by the reference numeral 60. The tabs 60 in each instance have secured thereto by any suitable means a support hanger 62 having a hooked lower extremity 64 and a support flange 66, the purpose of which will subsequently be made clear, disposed intermediate the two ends of the hanger.

The reference numeral 68 indicates a generally tubular baffle means disposed intermediate the inner surface of jacket 54 and the exterior surface of vessel 36. As will be seen in the drawing, the tubular baffle 68 extends substantially the entire length of vessel 36, but is spaced from the inverted conical surface 50 to permit the free flow of a heat transfer fluid about the lower end of the tubular baffle. The tubular baffle 68 is provided with a plurality of openings, one of which is shown at 70, corresponding to the hooked lower extremities of support hangers 62 and is held in position by the hooked ends of the support hangers extending through the openings 70. As illustrated, the tubular baffle 68 is provided with an annular deflection member 72 which assists in directing the heat transfer fluid in the desired flow path. If the jacket 54 is provided with windows, the baffle 68 should additionally have windows or openings, not illustrated, corresponding to the windows in jacket 54 so as not to block the view of the interior of vessel 36.

The reference numeral 74 designates a conical baffle means which is operatively disposed in the upper portion of the jacket 54 and which rests upon the support flanges 66 carried by support hangers 62. The conical baffle 74 is of a diameter at its base approximately equal to the diameter of the tubular baffle 68 and serves to direct heat transfer fluid entering the jacket 54 through conduit 56 such that it first passes between the inner vertical surface of jacket 54 and tubular baffle 68 rather than passing directly into contact with the vessel 36. Baffle 74 additionally serves as a radiation shield to reduce the heat loss by radiation from the top of vessel 36.

Extending through the closed upper end of jacket 54 are a plurality of heater rods 76 which depend through appropriately positioned openings 78 in conical baffle 74 and openings 80 the annular deflection member 72 such that the lower extremities of the heater rod are approximately even with the lower edge of tubular baffle 68. The heater rods 76 can be formed of any suitable heat conductive material such as silver plated copper and in each instance are provided with an internal resistance heating element through which a current can be passed by means of contacts 82 and 84 extending from the upper end of each of the heater rods. Means, not illustrated, is provided for supplying an EMF of a controlled variable voltage to be applied across the contacts 82 and 84 of each of the heater rods 76 so that the heat output of the rods 76 can be correlated with other process variables.

Extending through the upper end of jacket 54 is a conduit 86 having a threaded upper extremity 88 such that it can be connected to a suitable pressurized supply of heat transfer fluid. The conduit 86 is operatively connected to an annular heater 90 from which extends a plurality of nozzles 92. The nozzles 92 are directed into the space between the inner vertical surface of jacket 54 and the tubular baffle 68 so that when a gas or any suitable heat transfer fluid is supplied to conduit 86 under pressure, high velocity jets of the heat transfer fluid are injected into said space, thereby resulting in circulation through and about tubular baffle 68 of gas transiently present within chamber 56.

In operation the jacket 54 and the parts secured thereto are raised from operative position to fully expose vessel 36. Vessel 36 is then removed from base plate 12 and two rods 30 and 32 of semiconductor material, such as silicon, with attached holders are inserted into electrodes 14 and 16. The upper ends of the two rods of semiconductor material are then electrically connected by bridge 34. Vessel 36 and jacket 54 are then replaced in operative position as illustrated in the drawing.

Before attempting to deposit semiconductor material upon the rods 30 and 32 chamber 39 should be flushed with an inert gas or at least a gas which will not interfere with the reaction to be subsequently conducted. This is accomplished by introducing the inert gas or the like through tube 42 and nozzle 44 while simultaneously exhausting the air initially present in the chamber 39 through exhaust tube 40. An electrical current is then caused to flow through rods 30 and 32 by application of an EMF across leads 18 and 20 and the voltage is adjusted such that the rods 30 and 32 are heated to a desired temperature, i.e. about 1,050° C. to 1,200° C. in the case of silicon, by electrical resistance heating.

Before deposition of material is attempted upon rods 30 and 32 it is generally desirable to bring the walls of vessel 36 to a proper operating temperature and this can be accomplished by the application of the an EMF across the contacts 82 and 84 of each of the heater rods 76. Heat generated in the rod 76 by electrical resistance heating is transferred to the walls of vessel 36 by radiation and by convection. Of course, the walls of vessel 36 also receive some heat from rods 30 and 32 but at this time it will generally be found that the walls of vessel 36 receive insufficient heat from this source to heat them to a satisfactory temperature so that additional heat must be supplied from the heater rods 76.

If only the above steps are taken it will be found that the walls of vessel 36 are not at an uniform temperature and for reasons previously explained this makes efficient operation of the apparatus impossible. Therefore, even prior to the time that a heat transfer fluid is introduced through conduit 58 it is advantageous to introduce a small amount of fluid through conduit 86 and nozzles 92 to set up a rapid circulation of the gases within chamber 56 about and through tubular baffle 68. Introduction of heat transfer fluid through nozzles 92 results in a plurality of high velocity jets of fluid passing downwardly between the interior vertical wall of jacket 54 and the outside surface of tubular baffle 68. The heat transfer fluid passing downwardly in this area then strikes the surface 50 which acts as a baffle to direct the heat transfer fluid upwardly between the interior surface of tubular baffle 68 and the exterior vertical surface of vessel 36. During its passage through the tubular baffle 68 the fluid is warmed by contact with heater rods 76 and passes upwardly through the large opening in annular deflection member 72. The heated fluid is then mixed with fresh fluid issuing from the jets 92 and is recirculated turbulently about and through tubular baffle 68 to thereby result in the walls of vessel 36 being heated uniformly to the desired temperature range.

With rods 30 and 32 and vessel 36 at the desired temperatures the proper reaction gas or gases, usually in admixture with a reducing and/or purge gas, are then introduced into chamber 39 through nozzle 44. In the case of silicon the reaction gas is usually trichlorosilane or silicon tetrachloride, and hydrogen as a combination reducing gas and diluent is introduced therewith. The silicon halide gas introduced through nozzle 44 comes into contact with heated rods 30 and 32 and is decomposed to form elemental silicon and hydrogen chloride. The elemental silicon is deposited upon rods 30 and 32 and the hydrogen chloride is exhausted through tube 40 in a manner well known in the art.

As the rods increase in size by decomposition the amount of electrical energy required to maintain them at the desired temperature increases and this results in the release of heat in such amounts that the walls of vessel 36 slowly tend to become overheated, or in other words heated to a temperature range such that deposition of crystalline silicon or the like occurs thereon due to the silicon producing reaction, which is intended to be conducted exclusively at the surfaces of rods 30 and 32, being effected upon the interior surfaces of the vessel. To avoid this, the energy input into heater rods 76 and, correspondingly the heat output from rods 76, is gradually reduced and at such time that excess energy is being generated in chamber 39 to retain walls 36 within the desired temperature range, additional heat transfer fluid is introduced through conduit 58. The fluid being introduced through conduit 58 strikes conical baffle 74 and is thereby deflected such that it first enters the space between the inside vertical surface of jacket 54 and tubular baffle 68 before being brought into contact with the walls of vessel 36. Since the fluid within chamber 56 is being rapidly circulated by means of jets issuing from nozzles 92, it will be seen that fresh heat transfer fluid being introduced through conduit 58 is thoroughly mixed with fluid transiently present within the chamber 56 before being brought into contact with vessel 36. The heat transfer fluid introduced through conduit 58 as well as the heat transfer fluid introduced through nozzles 92 eventually passes through openings 52 in surfaces 50 into chamber 47 and is exhausted through flanged conduit 48. It will be seen, therefore, that by correlating the temperature differential of the fluid entering and being withdrawn from chamber 56, the rate at which the fluid is passed into and withdrawn from chamber 56, the heat output from heater rods 76, and the rate at which heat is transferred to the walls of vessel 36 from the rods 30 and 32, the walls of vessel 36 can be uniformly maintained within any desired narrow temperature range. This permits the reaction upon the surfaces of rods 30 and 32 to be conducted at a maximum rate without undesired deposition of semiconductor material or the like upon the interior surfaces of vessel 36 and without resulting in non-uniform deposition upon the surfaces of the rods 30 and 32.

Having thus described our invention and a preferred embodiment thereof, what we desire to claim and secure by Letters Patent is:

1. Temperature control means for an apparatus for deposition of a material on a hot body within a closed vessel, said temperature control means comprising enclosure means for surrounding said vessel, said enclosure means having an interior surface operatively disposed in spaced relationship to said vessel tubular baffle means operatively disposed intermediate said interior surface and said vessel, means for introducing a heat transfer fluid into the space between said interior surface and said vessel at a controlled rate, means for withdrawing said fluid from said space, heater means disposed within said space and in operative heat transfer relationship with said fluid, and fluid circulating means for operatively circulating said fluid through and about said tubular baffle means while it is transitorily in said space, whereby the temperature differential of the fluid entering and being withdrawn from said space, the rate at which said fluid is passed into and withdrawn from space, the heat output from said heater means, and the rate at which heat is transferred to said walls from said hot body can be correlated to maintain said walls within said narrow temperature range.

2. Apparatus according to claim 1 wherein the positional relationship of said means for introducing heat transfer fluid, said baffle means and said enclosure means, and the configuration of said baffle means is such that said fluid entering said space is first pased between said baffle means and said interior surface and is mixed with recirculated fluid before being brought into contact with said vessel.

3. Apparatus according to claim 2 wherein said fluid circulating means comprises a plurality of nozzles and means to supply a fluid to said nozzles under pressure, said nozzles in each instance being disposed so as to direct a jet of fluid between said baffle means and said interior surface.

4. In an apparatus for deposition of a seniconductor material upon a heated rod comprising an upstanding generally cylindrical vessel mounted upon a base through which feed materials necessary for deposition of said semiconductor material can be supplied, means for retaining the walls of said vessel within a narrow preselected temperature range comprising an enclosure jacket to enclose said vessel, said jacket having an interior surface spaced from said vessel, a tubular baffle disposed around said vessel in spaced relationship to said vessel, said base and said interior surface, means for introducing a heat transfer fluid through the upper end of said jacket at a controlled rate, a conical baffle disposed above the upper end of said vessel to deflect incoming heat transfer fluid into the region between said tubular baffle and said interior surface of said jacket, means to circulate heat transfer fluid transitorily present within said jacket about and through said tubular baffle, and outlet means near the bottom of said jacket for the withdrawal of said heat transfer fluid from within said jacket.

5. Apparatus according to claim 4 wherein said outlet means comprises an inverted frusto-conical baffle having a plurality of openings through which fluid can be withdrawn.

6. Apparatus according to claim 4 wherein said fluid circulating means comprises a plurality of nozzles to direct in each instance a stream of fluid into the region between said tubular baffle and said interior surface of said jacket.

7. In an apparatus for deposition of elemental silicon upon a heated rod of silicon by thermal decomposition of a compound of silicon and comprising an elongated vessel within which said thermal decomposition is operatively effected, means for retaining the walls of said vessel uniformly within a narrow preselected temperature range to thereby minimize deposition of silicon thereon comprising enclosure means enclosing at least a major portion of said vessel, said enclosure means having an interior surface operatively disposed in spaced relationship to said vessel to thereby provide an enclosed space within which a heat transfer gas can be circulated, tubular baffle means circumscribing said vessel and extending a major portion of the length thereof, said tubular baffle being disposed intermediate said interior surface of said enclosure means and said walls of said vessel, conical baffle means disposed within said enclosure means proximate one end of said vessel, means for introducing a heat transfer gas within said enclosure means such that it is operatively deflected by said conical baffle means to enter the region between said tubular baffle means and said interior surface of said enclosure means, a plurality of nozzles directed into said region between said tubular baffle means and said interior surface, means for supplying a gas under pressure to said nozzles, whereby gas issuing from said nozzles operatively results in circulation through and about said tubular baffle means of gas transiently present within said enclosed space, means to withdraw gas from said enclosed space at a controlled rate, and a plurality of heater rods extending longitudinally of said vessel and disposed between said tubular baffle means and said vessel, whereby the temperature differential of the cooling gas entering and being withdrawn from said enclosed space, the rate at which said cooling gas is passed into and withdrawn from said enclosed space, the heat output from said heater rods, and the rate at which heat is transferred to said walls from said heated rod of silicon can be correlated to maintain said walls uniformly within said narrow temperature range.

8. Apparatus according to claim 7 wherein said enclosure means is formed at least in part of heat insulating material to thereby limit the heat transferred from said enclosed space by means other than the withdrawal of said heat transfer gas.

References Cited
UNITED STATES PATENTS

| | | | |
|---|---|---|---|
| 1,744,817 | 1/1930 | Ward | 34—231 X |
| 1,964,115 | 6/1934 | Goodall | 34—221 |
| 3,171,755 | 3/1965 | Reuschel et al | 118—49.5 X |

CHARLES A. WILLMUTH, *Primary Examiner.*

J. P. McINTOSH, *Assistant Examiner.*